United States Patent
Boerefijn et al.

(10) Patent No.: US 10,752,871 B2
(45) Date of Patent: Aug. 25, 2020

(54) PREPARATION OF A POWDERED VINEGAR

(71) Applicant: Purac Biochem B.V., Gorinchem (NL)

(72) Inventors: Renee Boerefijn, Vlaardingen (NL); Marija Orlovic, Rotterdam (NL); Kees Van Der Voort Maarschalk, Wijchen (NL)

(73) Assignee: PURAC BIOCHEM B.V., Gorinchem (NL)

( * ) Notice: Subject to any disclaimer, the term of this patent is extended or adjusted under 35 U.S.C. 154(b) by 0 days.

(21) Appl. No.: 14/418,396

(22) PCT Filed: Jul. 31, 2013

(86) PCT No.: PCT/NL2013/050573
§ 371 (c)(1),
(2) Date: Jan. 29, 2015

(87) PCT Pub. No.: WO2014/021719
PCT Pub. Date: Feb. 6, 2014

(65) Prior Publication Data
US 2015/0225683 A1   Aug. 13, 2015

Related U.S. Application Data

(60) Provisional application No. 61/678,133, filed on Aug. 1, 2012.

(30) Foreign Application Priority Data

Aug. 1, 2012   (EP) ..................... 12178789

(51) Int. Cl.
| C12J 1/00 | (2006.01) |
| A23L 13/70 | (2016.01) |
| A23L 13/40 | (2016.01) |
| A23B 4/20 | (2006.01) |
| A23L 3/3463 | (2006.01) |
| A23B 4/12 | (2006.01) |

(52) U.S. Cl.
CPC .............. *C12J 1/00* (2013.01); *A23B 4/12* (2013.01); *A23B 4/20* (2013.01); *A23L 3/3463* (2013.01); *A23L 13/42* (2016.08); *A23L 13/72* (2016.08)

(58) Field of Classification Search
None
See application file for complete search history.

(56) References Cited

U.S. PATENT DOCUMENTS

| 3,445,244 | A | * | 5/1969 | Noznick | ............ C12J 1/00 426/103 |
| 2007/0059423 | A1 | | 3/2007 | Toledo | |
| 2008/0305228 | A1 | * | 12/2008 | Knikker | ............ C12J 1/00 426/422 |
| 2010/0310738 | A1 | * | 12/2010 | Ludwig | ............ A23B 4/027 426/266 |

FOREIGN PATENT DOCUMENTS

| CN | 102399676 A | | 4/2012 | |
| JP | S5130160 | * | 8/1976 | ....... C12J 1/00 |
| JP | 60-164475 A | | 8/1985 | |
| JP | 60164475 U | * | 10/1985 | |
| JP | 2006-087389 A | | 4/2006 | |
| JP | 2012044907 A | * | 3/2012 | |

OTHER PUBLICATIONS

"Mesh to Micron Conversion Chart" http://www.showmegold.org/news/Mesh.htm (Oct. 22, 2007).*
Ault, Techniques and Experiments for Organic Chemistry, 6th Edition, Journal of Chemical Education 1999 76 (12), pp. 303-304 (Year: 1999).*
JPS5130160—English Translation—pp. 1-4. (Year: 1976).*
International Search Report issued in International Application No. PCT/NL2013/050573 dated Oct. 25, 2013.

* cited by examiner

*Primary Examiner* — Nikki H. Dees
*Assistant Examiner* — Amber M Cox
(74) *Attorney, Agent, or Firm* — Foley & Lardner LLP

(57) ABSTRACT

The present invention provides a powdered vinegar that comprises partly neutralized vinegar, i.e. vinegar derived acid that is partly neutralized with e.g. sodium and/or potassium hydroxide, and free vinegar derived acid. The invention also provides a process for producing such a powdered vinegar and the use of this powdered vinegar in a foodstuff or a beverage, e.g. as a preservative. The present process offers the advantage that it yields a stable, free flowing powdered vinegar that can suitably be used as a preservative in e.g. processed meat products. The powdered vinegar has a high content of free acid, is easy to dissolve and acts as an acidulant.

17 Claims, No Drawings

PREPARATION OF A POWDERED VINEGAR

CROSS-REFERENCE TO RELATED APPLICATIONS

The present application is a National Stage of International Application No. PCT/NL2013/050573, filed Jul. 31, 2013, which claims priority to U.S. Provisional Application No. 61/678, 133, filed Aug. 1, 2012, and European Application No. 12178789.9, filed Aug. 1, 2012. The contents of these applications are herein incorporated by reference in their entirety.

FIELD OF THE INVENTION

The present invention provides a powdered vinegar comprising partly neutralized vinegar, e.g. neutralized with a sodium and/or potassium hydroxide, and free acid. The invention also provides a process for producing such a powdered vinegar and the use of this powdered vinegar in a foodstuff or a beverage, e.g. as a preservative.

BACKGROUND OF THE INVENTION

Industrial processing of meat for human consumption aims to provide processed meat products that combine an appealing appearance and flavor with microbial safety and prolonged shelf-life. Consumers evaluate meat products on the basis of a number of sensory attributes. Color, juiciness, flavor, and tenderness are believed to represent the most relevant sensory attributes of processed meat products. Color is the first factor noticed by consumers and is therefore given much attention.

A number of FDA approved compounds are widely used for the curing of meat, including salt, nitrite, nitrate (certain types of meats), reductants, phosphates, sodium lactate, sodium diacetate, citric acid, and sodium bicarbonate. Most ingredients used for curing are restricted by food regulatory agencies such as the FDA.

Consumers are becoming increasingly aware of the foods they eat and the additives which are included therein. As a result of this increasing awareness, sales of foods labeled "natural" are increasing. Consequently, food manufacturers are looking to replace 'artificial' food additives by natural ingredients so as to achieve a 'friendly label'. Also meat processors are looking for natural, friendly label alternatives that can replace artificial curing agents such as nitrate.

Vinegar is a well-known product that is widely used in domestic cooking as well as in industrially produced foodstuffs. When used as an ingredient in industrially produced foodstuffs, vinegar is usually listed on the label as "vinegar", even though vinegar is mostly used as an acidulant.

For some food applications, such as in most processed meat products, the use of liquid vinegar is not an option. This is why powdered vinegars have been developed.

US 2010/0310738 describes a vinegar-derived food additive composition which is a buffering food additive comprising vinegar-derived acetate, such as sodium acetate or potassium acetate, and vinegar and has a pH of about 7.0 to about 10.0. The buffering food additive is produced by treating vinegar with a basic neutralizing agent, such as sodium bicarbonate, sodium carbonate, or potassium bicarbonate, to produce a partially-neutralized vinegar with a pH of below about 7.0. The partially neutralized vinegar is dried, such as by evaporation and heat, to produce an acetate, such as sodium acetate or potassium acetate. Vinegar is added back to the acetate to produce a buffering food additive having a pH of about 7.0 to about 10.0.

US 2010/031078 further describes a method of preparing a food additive from vinegar comprising:
a) treating vinegar with a basic neutralizing agent to partially neutralize the vinegar to a pH of below about 7.0;
b) evaporating water from and drying the product of step (a) to produce an acetate; and
c) adding vinegar to the acetate of step (b) to produce a vinegar-acetate dry powder or solution having a pH of about 4.5 to a pH of about 10.0.

SUMMARY OF THE INVENTION

The present inventors have developed a process for the production of a powdered vinegar that yields a product that can suitably used as an additive in food products. The method according to the present invention comprises the steps of:
a) providing a first liquid vinegar;
b) adjusting the pH of said first liquid vinegar to a value within the range of 6.0-10.0. to produce a neutralized vinegar;
c) drying said neutralized vinegar to produce vinegar derived particles having a water content of less than 5 wt. %;
d) providing a second liquid vinegar;
e) combining said second liquid vinegar with the vinegar derived particles in a weight ratio of 1:15 to 1:5;
wherein, during step e), the vinegar derived particles are agitated and the temperature of the vinegar derived particles and second liquid vinegar is controlled to stay below 54° C.

The present process offers the advantage that it yields a stable, free flowing powdered vinegar that can suitably be used as a preservative in e.g. processed meat products. The powdered vinegar has a high content of free acid, is easy to dissolve and acts as an acidulant.

In the present process the neutralized vinegar is dried to a very low water content, resulting in the presence of a substantial amount of anhydrous salt in the vinegar derived particles. Although the inventors do not wish to be bound by theory, it is believed that at least a fraction of the water that is contained in the second liquid vinegar is incorporated in the powdered vinegar as a component of hydrated salt. Thus, at least part of the water contained in the second liquid vinegar is present in the powdered vinegar as bound water. Aa stable non-lumping powdered vinegar can be produced even if a substantial quantity of water is added as a part of the second liquid vinegar.

Another aspect of the invention relates to powdered vinegar that is obtained by the aforementioned process.

Yet another aspect of the invention relates to the use of the powdered vinegar in the preparation of foodstuffs and beverages.

DETAILED DESCRIPTION OF THE INVENTION

Accordingly, a first aspect of the invention concerns a process of producing a powdered vinegar comprising the steps of:
a) providing a first liquid vinegar;
b) adjusting the pH of said first liquid vinegar to a value within the range of 5.5-7.0, preferably in the range of 6.0-7.0 to produce a neutralized vinegar;

c) drying said neutralized vinegar to produce vinegar derived particles having a water content of less than 5 wt. %;
d) providing a second liquid vinegar;
e) combining said second liquid vinegar with the vinegar derived particles in a weight ratio of 1:15 to 1:1, preferably 1:7 to 1:1;

wherein, during step e), the vinegar derived particles are agitated and the temperature of the vinegar derived particles and second liquid vinegar is controlled to stay below 58° C.

The term "liquid vinegar" as used herein refers to an aqueous liquid that contains at least 4% (w/v) free acid. Liquid vinegar is typically produced by fermenting an alcohol containing liquid with acetic acid producing bacteria under aerobic conditions. Examples of liquid vinegars that may suitably be employed in the present process include malt vinegar, wine vinegar, sherry vinegar, apple cider vinegar, fruit vinegars, rice vinegar and combinations thereof.

Whenever reference is made herein to the water content of a material, unless indicated otherwise, this refers to the total amount of water that is contained in the material, including free as well as bound water (e.g. water contained in hydrated salts).

The powdered vinegar produced by the present process contains neutralized as well as free acid. The levels and hydration state of the neutralized acids in the powdered vinegar that are employed in the present process are such that they enable the production of a storage stable powdered vinegar despite the presence of appreciable levels of free acid and hydrated water.

The first liquid vinegar that is employed in the present process typically has a pH of less than 2.5, more preferably of less than 2.3, more preferably of less than 2.1, and most preferably less than 2.0, before the pH adjustment in step b). Typically, before the pH adjustment in step b), said pH may above 1, preferably above 1.2, more preferably above 1.4, most preferably above 1.5.

The first liquid vinegar typically contains 10-40% (w/v), more preferably 20-35% (w/v) and most preferably 25-30% (w/v) free acid. The dry matter content of the first liquid vinegar typically lies in the range of 10-42 wt. %. Preferably, the dry matter content is in the range of 20-37 wt. %, most preferably of 25-32 wt. %.

The first liquid vinegar may contain a certain amount of undissolved solids. Typically, the amount of undissolved solids does not exceed 10 wt.%. Even more preferably, the amount of undissolved solids does not exceed 5 wt. %, most preferably it does not exceed 1 wt. %.

Adjustment of the pH of the first liquid vinegar to a value within the range of 5.5 to 10.0 results in the formation of salts of buffered vinegar. According to a particularly preferred embodiment, the pH of the first liquid vinegar is adjusted to a value that does not exceed 8, preferably it does not exceed 7.5, more preferably it does not exceed 7.0, more preferably it does not exceed 6.9, most preferably it does not exceed 6.8. According to a particularly preferred embodiment, the pH of the first liquid vinegar is adjusted to a value that is not below 5.5, preferably it is not below 5.8, more preferably it does not below 6.0, more preferably it is not below 6.1, most preferably it is not below 6.2.

The adjustment of the pH of the first liquid vinegar in step b) of the present process preferably comprises addition of a neutralizing agent selected from the group consisting of a sodium hydroxide, potassium hydroxide, sodium (bi) carbonate, potassium (bi) carbonate and mixtures thereof.

According to a particularly preferred embodiment at least 50 mol. %, more preferably at least 80 mol. % and most preferably at least 90 mol. % of the metal cations contained in the neutralizing agent is Nat During the pH adjustment of step b), the temperature of the first liquid vinegar is kept below 65° C., preferably below 60° C., more preferably below 55° C. Controlling the temperature in this manner provides a product with improved (visual) appearance.

According to a particularly preferred embodiment, the neutralized vinegar is dried to produce vinegar derived particles having a very low water content of less than 5 wt. %, more preferably of less than 3 wt. %, even more preferably of less than 2 wt. % and most preferably of less than 1 wt. %

The neutralized vinegar is preferably dried at a temperature in excess of 58° C., more preferably in excess of 60° C. in order to maximize formation of anhydrous salts.

The neutralized vinegar is typically dried to produce vinegar derived particles having a volume weighted average diameter of 50-500 µm, more preferably of 100-400 µm, most preferably of 150-300 µm. This may suitably be achieved by breaking up the neutralized vinegar into droplets and drying these droplets, e.g. by spray drying. Alternatively, the vinegar derived particles may be produced by first drying the neutralized vinegar to produce a dry residue (e.g. by means of drum or oven drying) and by subsequently reducing the size of the dry residue by, for instance, grinding, milling or cutting.

Preferably drying of the neutralized vinegar in step c) comprises spray drying of the first liquid vinegar. In the present process, prior to the spray drying, the neutralized vinegar may be concentrated by evaporation. Preferably, the neutralized vinegar has a dry matter content of 20-60 wt. %, most preferably of 28-45 wt. % when it is sprayed into a spray dryer. In an embodiment of the invention, the process does not comprise a pre-concentration step and the neutralized vinegard subjected to the drying step c) has a dry matter content of below 40 wt. %, preferably below 35 wt. %, more preferably below 30 wt. %, most preferably below 29 wt. %,. The dry matter content is typically 20 wt. % or higher.

In an embodiment of the invention, the process does not comprise the step of subjecting the neutralized vinegar to a discoloration treatment, preferably it does not comprise a step of combining the nuetralized vinegar with activated carbon, or any other adsorption agent. As indicated herein before, the products obtained in accordance with this invention have acceptable visual appearance and the application of discoloration treatments typically will not be necessary.

The spray drying of the neutralized vinegar is advantageously performed in a spray-drying apparatus equipped with a spinning wheel atomizer. The spinning wheel atomizer is preferably operated at 6,000-20,000 rpm In the process of the present invention the second liquid vinegar is preferably combined with the vinegar derived particles by spraying the second liquid vinegar onto the vinegar derived particles. By gradually spraying the second liquid vinegar onto the agitated vinegar derived particles in the form of a very fine spray lump formation may be avoided and a homogeneous powdered vinegar having a uniform particle size can be produced.

Agitation of the vinegar derived particles can be achieved, for instance, by tumbling, by stirring, by shaking or by keeping these particles in a fluidized bed. Most preferably agitation of the vinegar derived particles is achieved by keeping these particles in a fluidized bed. In accordance with a preferred embodiment of the present process step e) is performed in a fluidized bed apparatus.

The second liquid vinegar typically comprises 20-55% (w/v), more preferably 22-52% (w/v) and most preferably 25-50% (w/v) acid. The second liquid vinegar preferably has a pH of less than 2.5, more preferably of less than 2.3, more preferably of less than 2.1, and most preferably less than 2.0. Typically, said pH may above 1, preferably above 1.2, more preferably above 1.4, most preferably above 1.5.

The dry matter content of the second liquid vinegar typically lies in the range of 20-58 wt. %. Preferably, the dry matter content is in the range of 22-54 wt. %, most preferably of 25-51 wt. %.

Typically, the second liquid vinegar contains not more than 5 wt. % of undissolved solids. Even more preferably, the amount of undissolved solids does not exceed 1 wt. %, most preferably it does not exceed 0.1 wt. %.

In step e) of the present process the second liquid vinegar is preferably combined with the vinegar derived particles in a weight ratio of 8:92 to 60:40, most preferably of 10:90 to 40:60. In an embodiment of the invention the second liquid vinegar is combined with the vinegar derived particles in a weight ratio of 1:15 to 1:1, preferably 1:15 to 1:5. In an alternative embodiment of the invention the second liquid vinegar is combined with the vinegar derived particles in a weight ratio of 1:7 to 1:1, preferably 1:7 to 1:5.

During the combining of the second liquid vinegar and the vinegar derived particles exothermic processes (e.g. hydration) occur. An important element of the present invention is to control step e) of the process to avoid that these exothermic processes cause the temperature of vinegar derived particles and the second liquid vinegar to exceed 58° C. If during step e) temperature of the vinegar derived particles increases to above 58° C. unwanted melting and subsequent wet quenching and lump formation may occur. Additionally, at the indicated temperature evaporation of free acid from the second liquid vinegar and/or vinegar derived particles becomes significant, to such extent that it may no longer be possible to produce a final product having the desired level of free acid.

According to a particularly preferred embodiment, during step e) the temperature of the vinegar derived particles and the second liquid vinegar is controlled to stay below 58° C., preferably below 54° C., more preferably below 50° C., still more preferably below 45° C. and most preferably below 35° C.

In order to ensure that the aforementioned exothermic processes do not cause the temperature of the vinegar derived particles and the second liquid vinegar increases to an undesired level typically some form of cooling will be applied during step e). Cooling may be achieved in different ways, e.g. carrying out step e) in an apparatus that comprises external cooling means and/or by cooling the vinegar derived particles and/or the second liquid vinegar before they are combined. In case step e) employs a gas flow, e.g. in case of a fluidized bed, it is advantageous to control the temperature of vinegar derived particles and the second liquid vinegar by adjusting the temperature of the gas.

According to a particularly preferred embodiment, step e) is carried out using a bed of vinegar derived particles that is kept in a fluidized state by a continuous gas flow and the temperature conditions during this step e) are controlled by monitoring the temperature and by adjusting the temperature and/or flow rate of the continuous gas flow in response to the measured temperature. This embodiment offers the advantage that the temperature conditions during step e) can be carefully controlled, enabling the production of a powdered vinegar of constant quality.

During the combining of the second liquid vinegar with vinegar derived particles preferably not more than a limited amount of dehydration occurs. Typically, water loss during the combining of the second liquid vinegar with the vinegar derived particles is below 20%, more preferably below 10% and most preferably below 5%. Here the water loss refers to the percentage of the total amount of water contained in the quantity of second liquid vinegar that is added to the vinegar derived particles that does not end up in the powdered vinegar.

In an embodiment of the invention, the process does not comprise any steps of combining the vinegar derived particles with an organic acid, especially an organic acid selected from the group consisting of citric acid, tartaric acid, malic acid, fumaric acid and fumaric acid sodium salt, in addition to combining the vinegar derived particles with said second liquid vinegar.

The combination of the second liquid vinegar with the vinegar derived particles in step e) yields a particulate product that is optionally subjected to a drying step to yield the powdered vinegar of the present invention. Preferably, however, no additional drying step is used.

An aspect of this invention concerns a powdered vinegar as obtainable by the process described in the foregoing. This powdered vinegar may consist essentially of vinegar derived components or it may additionally comprise other food-grade ingredients, e.g. a carrier material such as maltodextrin, proteins, sugar, etc. The present process however offers the advantage that it enables the production of powdered vinegar without the use of substantial quantities of carrier materials. Consequently, in an embodiment the total combination of vinegar derived free and neutralized acids represents at least 50%, more preferably 80-100% and most preferably 90-100% of the dry matter that is contained in the powdered vinegar. As used herein 'vinegar derived free and neutralized acids' refers to all free and neutralized acid originating from the first and second liquid vinegar used as the starting materials for producing the powdered vinegar. As will be understood by those skilled in the art, the exact composition of these liquid vinegars depends, amongst other, on the type of vinegar used. Typically, in accordance with this invention, more than 90 wt. % of the free and neutralized acids in liquid vinegar (and, hence, of the 'vinegar derived free and neutralized acids') is acetic acid, in free and neutralized form, more preferably more than 95 wt. %, more preferably more than 97 wt. % and most preferably more than 99 wt. %. Other acids which may be present in smaller quantities in liquid vinegar, and thus may also be part of the 'vinegar derived free and neutralized acids' include lactic acid, malic acid, citric acid and tartaric acid, in free and neutralized form. Besides vinegar derived free and neutralized acids and water, the powdered vinegar of the present invention may contain appreciable levels of other vinegar derived components. Examples thereof typically include sugars, proteins, amino acids, minerals, vitamins, natural pigments (e.g. anthocyanins or caramel) and combinations thereof. According to a preferred embodiment, the vinegar powder contains 0-10 wt. %, more preferably 0.1-5 wt. % and most preferably 0.2-2 wt. % of such further vinegar derived components.

Free vinegar derived acid and neutralized vinegar derived acid are typically contained in the powdered vinegar in a weight ratio of 1:30 to 1:5. Even more preferably the latter weight ratio is within the range of 1:27 to 1:6, most preferably of 1:25 to 1:8.

The content of free vinegar derived acid of the powdered vinegar typically exceeds 3.5 wt. %. Even more preferably, the powdered vinegar contains 3.8-20 wt. %, most preferably 4.0-15.0 wt. % free acid.

The powdered vinegar preferably contains a total amount of neutralized vinegar derived acid, notably sodium and potassium salts of the vinegar derived acid, in the range of 40-92 wt. %, more preferably in the range of 50-90 wt. % and most preferably of 60-85 wt. % by weight of dry matter.

It is further preferred that $Na^+$ represents at least 50 mol %, more preferably at least 70 mol. % and most preferably at least 90 mol. % of the cations of the salts that are contained in the powdered vinegar.

The levels and hydration state of the neutralized acids that are employed in the present process are such that they enable the production of a storage stable powdered vinegar despite the presence of appreciable levels of free acid and hydrated water. The powdered vinegar produced in the present process can contain an appreciable level of water. Typically, the powdered vinegar has a water content of 4-35 wt. %, more preferably 9-32 wt. %. In an embodiment of the invention the powdered vinegar has a water content of 4-20 wt. %, more particularly of 5-15 wt. % and even more particularly of 6-12 wt. %.

The powdered vinegar produced by the present process preferably has a volume weighted average diameter of 50-600 μm, more preferably of 100-500 μm and most preferably of 150-350.m.

The bulk density of the powdered vinegar typically lies in the range of 300-600 kg/m³. Most preferably, the bulk density lies in the range of 350-450 kg/m³.

Another aspect of the invention relates to a food-grade preservative in the form of a free-flowing powder comprising a powdered vinegar as described herein before. Yet another aspect of the present invention relates to a method of producing a foodstuff or a beverage, said method comprising combining a powdered vinegar as defined herein before with one or more other edible or potable ingredients.

Typically, in the aforementioned method the powdered vinegar is combined with the one or more other edible or potable ingredients in an amount of 0.1-5%, more preferably in an amount of 0.2-1.5% by weight of the foodstuff or the beverage.

A further aspect of the invention relates to the use of the powdered vinegar of the present invention for the preservation of a food product, notably a meat product.

The invention is further illustrated by the following non-limiting examples.

EXAMPLES

Example 1

Three hundred grams of concentrated grain vinegar (free acid content=28.9% (wt)) were introduced into a reactor that was equipped with a pH probe and a cooling mantle. Next, an aqueous sodium hydroxide solution (50%) was slowly added under continuous mixing and cooling so as to keep the temperature of the mixture below 65° C. The addition of sodium hydroxide was discontinued as soon as the pH of the mixture has increased to at most 7.0. Mixing is continued for another 30 minutes.

The neutralized vinegar so obtained was fed to a spray-drier equipped with an atomizer wheel and spray-dried using air with a temperature of about 150° C. The spray-dried powder was introduced into a fluidized bed operated with air at about 10° C. Vinegar of about 28.9% wt dry solids content was sprayed onto the powder in a final ratio of about 83% powder to about 17% vinegar. The powder reached a temperature of about 32° C.

The invention claimed is:

1. A process of producing a free-flowing powdered vinegar, comprising:
    (a) adjusting the pH of a first liquid vinegar to a value between 5.5-10.0 to obtain a neutralized vinegar, the pH adjustment comprising adding a neutralizing agent selected from the group consisting of sodium hydroxide, potassium hydroxide, sodium (bi) carbonate, potassium (bi) carbonate and mixtures thereof;
    (b) drying the neutralized vinegar at a temperature in excess of 60° C. to produce vinegar derived particles having a water content of less than 5 wt. %;
    (c) combining a second liquid vinegar with the vinegar derived particles in a weight ratio of 1:15 to 1:1, obtaining a free-flowing powdered vinegar, comprising:
    80-100 wt. % of the combination of vinegar derived free and neutralized acids by weight of dry matter;
    40-92 wt. % sodium and potassium salts of vinegar derived acid by weight of dry matter;
    at least 3.5 wt. % of free acid; and
    9-35 wt. % water,
    wherein more than 90 wt. % of free and neutralized acids of both the first liquid vinegar and the second liquid vinegar is acetic acid in free and neutralized form, and wherein the first and second vinegar each contain at least 4% (w/v) free acid, wherein, during (c), the vinegar derived particles are agitated and the temperature of the vinegar derived particles and second liquid vinegar is cooled to stay below 54° C. to produce the free-flowing powdered vinegar, and wherein $Na^+$ represents at least 50 mol % of the cations of the salts that are contained in the powdered vinegar.

2. The process according to claim 1, wherein free and neutralized vinegar derived acids together represent 90-100 wt. % of the dry matter in the powdered vinegar.

3. The process according to claim 1, wherein free vinegar derived acid and neutralized vinegar derived acid in the powdered vinegar are present in a weight ratio of 1:30 to 1:5.

4. The process according to claim 1, wherein the first liquid vinegar contains 10-40% (w/v) free acid.

5. The process according to claim 1, wherein the vinegar derived particles have a volume weighted average diameter of 50-500 μm.

6. The process according to claim 1, wherein the second liquid vinegar comprises 20-55% (w/v) free acid.

7. The process according to claim 1, wherein the second liquid vinegar is sprayed onto the vinegar derived particles.

8. The process according to claim 1, wherein the pH of the first liquid vinegar is adjusted to a value within the range of 6.0-8.0.

9. A powdered vinegar in the form of a free-flowing powder obtainable by the method according to claim 1, comprising at least 3.5 wt. % of free acid and a water content of 6-35 wt. %.

10. A method of producing a foodstuff or beverage, comprising combining a free-flowing powdered vinegar according to claim 9 with one or more other edible or potable ingredients.

11. The method according to claim 10, wherein the free-flowing powdered vinegar is combined with the one or more other edible or potable ingredients in an amount of 0.1-5% by weight of the foodstuff or the beverage.

12. A method of preserving a food product, comprising adding to the food product a free-flowing powdered vinegar according to claim 9.

13. The process according to claim 1, wherein, during (c), the vinegar derived particles are agitated and the temperature of the vinegar derived particles and second liquid vinegar is controlled to stay below 50° C.

14. The process according to claim 1, wherein, during (c), the vinegar derived particles are agitated and the temperature of the vinegar derived particles and second liquid vinegar is controlled to stay below 35° C.

15. The process according to claim 1, wherein, during (b), vinegar derived particles are produced having a water content of less than 3 wt. %.

16. The process according to claim 1, wherein, during (b), vinegar derived particles are produced having a water content of less than 2 wt. %.

17. The process according to claim 1, wherein, during (c) less than 20 wt. % of the water contained in the second liquid vinegar is lost and does not end up in the powdered vinegar.

\* \* \* \* \*